United States Patent [19]

Bassett et al.

[11] 3,969,176

[45] July 13, 1976

[54] METHOD FOR HEAT SEALING POLYESTER FILM

[75] Inventors: Howard D. Bassett, Downers Grove; Franklin E. Schrage, Flossmoor; George F. Kirkpatrick, Downers Grove, all of Ill.

[73] Assignee: Union Carbide Corporation, New York, N.Y.

[22] Filed: Dec. 18, 1973

[21] Appl. No.: 425,860

Related U.S. Application Data

[62] Division of Ser. No. 190,277, Oct. 18, 1971, Pat. No. 3,798,116.

[52] U.S. Cl.............................. 156/251; 156/272; 156/311; 156/499; 428/480
[51] Int. Cl.².................. B32B 31/26; B32B 31/28
[58] Field of Search ............ 156/272, 306, 499, 82, 156/515, 311, 251; 53/39; 428/480

[56] References Cited
UNITED STATES PATENTS

| | | |
|---|---|---|
| 3,009,851 | 11/1961 | Madsen............................ 156/306 X |
| 3,165,499 | 1/1965 | Alles................................... 161/402 |
| 3,321,353 | 5/1967 | Zelnick............................... 156/515 |
| 3,355,337 | 11/1967 | Zelnick........................... 156/515 X |
| 3,413,175 | 11/1968 | Rochla............................ 156/499 X |
| 3,574,046 | 4/1971 | Buteux............................ 161/231 X |
| 3,736,219 | 5/1973 | McTaggart...................... 156/306 X |

*Primary Examiner*—William A. Powell
*Assistant Examiner*—M. G. Wityshyn
*Attorney, Agent, or Firm*—Franklyn Schoenberg

[57] ABSTRACT

A flexible heat set biaxially oriented film article having in at least one portion thereof a bead type heat seal is prepared by clamping together adjacent the portion to be heat sealed, superimposed plies of a heat set, biaxially oriented polyester film, said film being characterized as having a tensile strength of at least 15,000 psi and a ratio of tensile strengths in the TD to MD direction between about 0.67 and 1.5, imposing a heat energy source to fuse in a bead type seal the superimposed film and maintaining the plies of film pressed together until the source of heat energy is retracted therefrom.

6 Claims, No Drawings

METHOD FOR HEAT SEALING POLYESTER FILM

This is a division of application Ser. No. 190,277 filed Oct. 18, 1971, now U.S. Pat. No. 3,798,116, issued Mar. 19, 1974.

The present invention relates to polyester polymeric films, and, more particularly, to an improved process for heat sealing polyester polymeric films to prepare articles suitable for packaging applications.

Polyester films are well known, the properties thereof having made them useful in a wide range of applications. The high strength and clarity of such films would make them highly useful as packaging materials for food and other products but, to date, such use has been limited by the difficulties experienced in heat sealing and bonding the films. Contributing to the difficulties of heat sealing polyester films is the orientation procedure required to enhance the physical properties of the film and the effect of heat sealing temperatures on the oriented film both as to immediate and aged seal strength characteristics. Heretofore, polyester films used in packaging applications have been principally employed as a base material for laminated or coated structures with polyolefins or other heat sealable coating materials applied thereto to afford heat sealability.

In accordance with the present invention, it has been discovered that flexible film articles can be prepared by heat sealing high strength polyester polymeric films by a process comprising the steps of:

a. superimposing a first ply of flexible, biaxially oriented, heat set polyester polymeric film over a second ply of said polyester polymeric film, each of said plies of film being characterized as having a tensile strength of at least about 15,000 psi and a ratio of transverse and machine direction tensile strengths between about 0.67 and 1.5;

b. clamping said plies of superimposed film adjacent a portion to be heat sealed so as to press the first and second plies of film against each other and maintain the portion of film to be heat sealed in a substantially untensioned state;

c. imposing on said superimposed plies of film heat from a heat energy source of sufficient intensity and for only the time necessary to fuse in a bead type seal the superimposed portion of untensioned film; and d. maintaining said plies of film pressed together until the source of heat energy is retracted therefrom.

It is essential that the polyester film be biaxially oriented and then "heat set" so as to have low shrinkage at elevated temperatures. Film exhibiting shrinkage of less than about 3.0% at 150°C. and less than about 10.0% at 200°C. is suitable for use in accordance with the practice of the present invention. "Heat setting" is a process of heat treating oriented polyester film while the film is under restraint which generally is carried out immediately after the film orientation procedure as, for example, disclosed in U.S. Pat. No. 2,823,421 to Scarlett.

It is also essential that the biaxially oriented, heat set polyester film has a tensile strength of at least about 15,000 psi and preferably at least about 18,000 psi and that the tensile strengths of each ply of film measured in the transverse direction (TD) and the machine direction (MD) is in a ratio of TD to MD of from about 0.67 and 1.5 and preferably from about 0.85 and 1.3.

The first and second plies of film may be supplied from separate sources and superimposed one on the other, may be a web of film folded longitudinally having one portion thereof superimposed on the other, or may be the upper and lower plies of film supplied in tubing form.

Clamping means such as disclosed, for example, in U.S. Pat. No. 3,243,330 to Zelnick may be employed to press the layer of film together and maintain the portion of film to be heat sealed in a substantially untensioned state. The layers of film to be pressed together should be that portion of superimposed film immediately adjacent the portion or band of film to be heat sealed. The portion or band of film to be heat sealed and, therefore, that portion to be maintained in a substantially untensioned state, is preferably a band that is between about ⅛ inch and ¼ inch wide and, in general, extends the entire width or length of superimposed film to be heat sealed. The amount of film pressed together by the clamping means may vary depending on the type of clamping means employed and is not critical to the practice of the present invention, but it is essential that the film pressed together extends the full length and is coextensive with the length of film to be fused and heat sealed during any one heat sealing operation. Further, the superimposed plies of film must be maintained under clamping pressure until the plies of film have been fused and heat sealed and the heat energy source is retracted therefrom. Preferably, the plies of film will be pressed together until the fused plies have cooled below the melting temperature of the film.

Polyester polymeric film suitable for use in preparing the articles of the present invention in accordance with the practice thereof may be biaxially oriented, heat set film prepared from linear, polymeric esters as, for example, the polyethylene terephthalic esters disclosed in U.S. Pat. No. 2,465,319 to Whinfield et al. Film having an average molecular weight of at least about 15,000, an intrinsic viscosity of at least about 0.5 and characterized by a density of at least about 1.39 gms/cc, a melting point between about 240°C. and 260°C., a tensile strength of at least about 15,000 psi, a ratio of tensile strengths in the transverse direction (TD) and machine direction (MD) of between about 0.67 and 1.5 and shrinkage at elevated temperature that is less than about 3.0% at 150°C. and less than about 10.0% at 200°C. has been found suitable. Film that is preferred and most advantageously employed is characterized by a tensile strength of at least about 18,000 psi, a TD/MD tensile strength ratio of between about 0.85 and 1.3 and shrinkage at elevated temperature that is less than about 2.0% at 150°C. and less than about 6.0% at 200°C.

Heat sealing the clamped, pressed together superimposed plies of polyester film having the characteristics hereinabove described may be accomplished by imposing on the untensioned portion of said film sufficient heat for the time necessary to melt and fuse the plies of film without undue thermal degradation thereof. It has been found that while the temperature for heat sealing the plies of polyester film is not critical and a wide range of heat sealing temperatures may be suitable, the type of heat energy source employed is important in order to obtain the quality and uniformity of sealing desired. Radiant heat sealing devices of the type disclosed, for example, in U.S. Pat. No. 3,243,330 to Zelnick are preferably employed in heat sealing polyester film in accordance with the practice of the present invention. Suitable radiant heat sealing devices may employ radiant heating elements that supply sufficient radiant heat energy to melt and fuse the plies of film into bead like seals without contacting the film or, alternatively, such devices may employ radiant heating elements that contact and sever the plies of film while emitting sufficient heat energy to melt and fuse the film. The radiant heating elements may be heated to any temperature high enough to melt and fuse the film but it is preferred to use the radiant heating element at a temperature of at least about 1100°F. and, better yet, at a temperature between about 1200°F. and 1300°F. The dwell time required at these temperatures is quite short and bead like seals exhibiting uniform quality and strength are readily obtainable.

Another significant advantage found in the heat sealing process of the present invention is derived from the preparation of parallel and separate bead like seals in the untensioned portion of film between the clamping means employed to press the plies of film together, the film therebetween having been severed during the formation of the bead like seals. Accordingly, when a continuous web of superimposed plies of polyester film is employed in the process, separate, adjacent sealed segments of film are simultaneously prepared.

In accordance with the practice of the present invention, there is prepared a flexible heat set, biaxially oriented polyester polymeric film article having in at least one portion thereof a bead type heat seal. Polyester film is available in a thickness that ranges from about 0.0002 inch to about 0.010 inch or even thicker, but it is generally preferred to employ a flexible film of between about 0.0005 inch and 0.002 inch in thickness. A polyester film article having a portion thereof heat sealed in accordance with the practice of the present invention exhibits average heat seal strengths of at least about 6 pounds/inch of film width and preferably at least about 8 pounds/inch as tested within 24 hours of preparation and averages at least about 4 pounds/inch of film width after aging at 140°F. for 5 weeks. The significant retention of heat seal strength after aging is of major importance in the preparation of articles from polyester films and is one of the several benefits afforded by the present invention.

flexible Flexible articles of the present invention may be prepared in the form of tubing, bags, containers, pouches and the like which are suitable for numerous packaging and other applications. Such articles may be prepared by heat sealing the plies of film in either the MD or TD direction and may be formed with as many bead like heat seals as required.

The following examples are illustrative of the practices of the invention but they are not be to construed as in any way limitative since various modifications can be made in the light of the guiding principles and teachings disclosed herein.

EXAMPLE 1

A "Weldotron" Model W 5222 intermittent radiant heat sealer was employed in this example. This sealer uses film clamping means comprising stationary lower jaws and movable upper jaws that clamp the film therebetween, and a movable radiant heating element that contacts and severs the film to be heat sealed. The radiant sealing element was maintained at a temperaure between about 1200° and 1300°F. and was long enough to completely heat seal the plies of film in one operation.

Polyester polymeric films, 0.0005 inch (½ mil) thick, having the properties summarized in Table I below were employed in this example. Flat sheets of film were superimposed one on the other with the machine and transverse directions of each film aligned. Clamps spaced 3/16 inch apart were used to press the plies of film together and provide a band of untensioned film therebetween in which the heat seals were to be formed. Heat seals were formed in both the transverse direction and machine direction, the transverse direction seal was formed perpendicular to the machine direction of the film and the machine direction seal was formed parallel to the machine direction of the film.

TABLE I

| Film | Film A | Film B |
|---|---|---|
| Ultimate Tensile (TD) psi | 35,400 | 18,400 |
| Ultimate Tensile (MD) psi | 23,200 | 18,600 |
| TD/MD ratio | 1.5 | 1.0 |
| Specific Gravity | 1.39 | 1.395 |
| Shrinkage at 150°C. % | 1.8 | 2.0 |
| at 200°C. % |  | 6.0 |
| Intrinsic Viscosity |  | .55 |

The plies of film were fused and severed with each operation of the heat sealin apparatus with parallel, bead like seals being formed along the edges of each adjacent segment of heat sealed film. Samples of the heat sealed film segments were evaluated within 24 hours of preparation and additional samples were aged at 73°F. and 140°F. for varying periods of time. A summary of the seal strength properties of both unaged and aged heat seal film samples is reported in Table II.

TABLE II

| | Heat Seal Strength (lbs./in.) | | | | | | | |
|---|---|---|---|---|---|---|---|---|
| | Film A | | | | Film B | | | |
| Aging Time (weeks) | Aged at 73°F. | | Aged at 140°F. | | Aged at 73°F. | | Aged at 140°F. | |
| | TD | MD | TD | MD | TD | MD | TD | MD |
| No Aging | 7.4 | 10.8 | 7.4 | 10.8 | 7.7 | 9.4 | 7.7 | 9.4 |
| 1 | 6.5 | 11.7 | 6.2 | 10.2 | — | — | 7.3 | 7.2 |
| 2 | — | — | — | — | 8.6 | 8.5 | 7.9 | 7.9 |
| 3 | 7.4 | 11.7 | 6.2 | 8.6 | — | — | — | — |
| 4 | — | — | — | — | 6.7 | 8.5 | 5.6 | 6.4 |
| 6 | 4.0 | 12.0 | 2.9 | 6.3 | 6.2 | 6.7 | 4.5 | 9.6 |
| 8 | 3.0 | 11.5 | 2.2 | 5.7 | 8.6 | 9.2 | 4.0 | 8.5 |
| 10 | 4.7 | 8.1 | 2.0 | 4.7 | 8.1 | 8.5 | 4.4 | 9.1 |

The ultimate tensile and seal strength tests reported herein were run in accordance with the test procedure of ASTM D 882-64T using a jaw separation speed of 20 inches/min. An "Instron" tensile test machine was used in these evaluations. The tensile and seal strength properties used throughout the specification and in the claims shall be interpreted according to this test procedure.

Heat seals formed in polyester polymeric film in accordance with the practice of the present invention exhibited high seal strength properties as formed. Heat seals formed in Film B, said film having a TD/MD ratio of 1.0, extracted somewhat better retention of seal strength properties than seals formed in Film A (TD/MD ratio of 1.5) when aged for an extended period at 140°F.

EXAMPLE 2

A "Weldotron" Model W 2318 continuous radiant heat sealing machine as described, for example, in U.S. Pat. No. 3,243,330 was employed in this example. The following polyester polymeric films were used in this example:

Film A: Film A of Example 1 was used in this example.
Film B: A ½ mil thick polyester film having the following ultimate tensile strength properties:
TD — 32,000 psi
MD — 25,000 psi
TD/MD = 1.28.

Heat seals formed in Film A and Film B using the continuous radiant heat sealer described above, operating at a temperature between about 1200° and 1500°F. and a clamp spacing of about ¼ inch, were determined to have the following heat seal strenth:

| Film A | Seal Strength (lbs./in.) | TD | 7–8 |
|---|---|---|---|
|  |  | MD | 7–8 |
| Film B | Seal Strength (lbs./in.) | TD | 6–7 |
|  |  | MD | 8. |

EXAMPLE 3

Using the apparatus and procedures of Example 1, the following polyester polymeric films were heat sealed.

Film A — a heat set biaxially oriented film of intrinsic viscosity of about 0.55 having tensile strengths in the transverse direction of 30,000 psi and in the machine direction of 20,000 psi. The TD/MD ratio was 1.5. The film thickness was 0.00075 inches (0.75 mils).

Film B — a heat set biaxially oriented polyester film of intrinsic viscosity of about 0.55 having a transverse direction tensile strength of 22,000 psi and machine direction tensile strength of 21,000 psi with the TD/MD ratio being 1.0. The thickness of this film was 0.92 mils.

Film C — a biaxially oriented shrinkable polyester film having a shrinkage of about 30% at 100°C.

Superimposed plies of each of Film A, Film B and Film C were heat sealed. The original strength (measured within 24 hours of forming) of the seals formed with Film A and Film B are as follows:

| Film A | MD | 13.6 lbs./in. |
|---|---|---|
|  | TD | 6.0 lbs./in. |
| Film B | MD | 16.0 lbs./in. |
|  | TD | 17.0 lbs./in. |
| Film C | heat seals could not be formed in this film. | |

What is claimed is:

1. A method for heat sealing superimposed layers of flexible, biaxially oriented, heat set polyester polymeric films, prepared from polyethylene terephthalic esters including the steps of:
   a. superimposing a first ply of said flexible, biaxially oriented, heat set polyester polymeric film over a second ply of said polyester film each of said plies of film being characterized as having a tensile strength of at least about 15,000 psi and a ratio of transverse to machine direction tensile strengths between about 0.67 and 1.5;
   b. clamping a portion of said plies of super-imposed film adjacent to and for at least the length thereof coextensive with the portion to be heat sealed so as to press the first and second plies of said film against each other and maintain the portion of said film to be heat sealed in a substantially untensioned state;
   c. imposing on the portion of said superimposed plies of film to be heat sealed heat from a heat energy source of sufficient intensity for the time necessary to fuse in a bead type seal the portion of untensioned superimposed film; and
   d. maintaining said plies of film pressed together until the source of heat energy is retracted therefrom.

2. The method of claim 1 wherein the heat energy source is a radiant heat energy source.

3. The method of claim 2 wherein the radiant heat energy source contacts and severs the portion of film to be heat sealed.

4. The method of claim 1 wherein said superimposed plies of film are fused into separate, adjacent bead type seals.

5. The method of claim 1 wherein said plies of film are characterized as having a ratio of transverse to machine direction tensile strenth between about 0.85 and 1.3.

6. The method of claim 1 wherein said heat energy source is at a temperature of at least about 1100°F.

* * * * *

UNITED STATES PATENT OFFICE
CERTIFICATE OF CORRECTION

Patent No. 3,969,176              Dated July 13, 1976

Inventor(s) Howard D. Bassett et al.

It is certified that error appears in the above-identified patent and that said Letters Patent are hereby corrected as shown below:

Column 4, line 60, "extracted" should read -- exhibited --.

Signed and Sealed this twelfth Day of July 1977

[SEAL]

Attest:

RUTH C. MASON
*Attesting Officer*

C. MARSHALL DANN
*Commissioner of Patents and Trademarks*